United States Patent [19]

Luna

[11] 4,008,949

[45] Feb. 22, 1977

[54] PROTECTIVE REFLECTIVE HELMET

[76] Inventor: Jerry Martin Luna, 2795 S. Bannock St., Englewood, Colo. 80110

[22] Filed: Nov. 6, 1975

[21] Appl. No.: 629,212

[52] U.S. Cl. .................................. 350/98; 264/258; 350/105

[51] Int. Cl.[2] ........................................... G02B 5/12

[58] Field of Search ............ 350/98, 109, 103, 104, 350/105, 106, 99

[56] References Cited

UNITED STATES PATENTS

| | | | |
|---|---|---|---|
| 3,252,376 | 5/1966 | DeVries | 350/104 |
| 3,469,898 | 9/1969 | Altman | 350/103 |
| 3,577,561 | 5/1971 | Oshima | 350/98 |
| 3,871,336 | 3/1975 | Bergman | 350/98 |

*Primary Examiner*—John J. Corbin
*Assistant Examiner*—B. Wm. delos Reyes

[57] ABSTRACT

A protective helmet having an internal integral layer of reflective material and the method of constructing the same is disclosed. A first layer of catalyzed clear gel coat is sprayed under pressure into a helmet mold and allowed to dry. A second fog layer of clear gel coat is sprayed over the first layer to form a tacky surface upon which small double sided reflective chips can be sprinkled and brushed flat. The second gel coat is then dried thoroughly. A third backing layer of clear gel coat containing metal flakes is then sprayed over the second layer and completely dried. A layer of saturated fiber-glass mat is applied over the third layer to seal in the reflective chips and to eliminate any air pockets. Layers of fiberglass cloth are then applied over the mat and the fiberglass is completely dried. The helmet is popped from the mold, sanded and finished.

8 Claims, 22 Drawing Figures

PROTECTIVE REFLECTIVE HELMET

BACKGROUND OF THE INVENTION

1. Field of the Invention

The present invention relates generally to protective helmets and more particularly to reflective motorcycle helmets.

2. Description of the Prior Art

The market for reflective protective helmets, including reflective motorcycle helmets, is growing due to the increasing number of states passing special legislation requiring operators of motorcycles to wear night reflective motorcycle helmets. In those states where such legislation has not been passed, there is a growing demand from motorcyclists recognizing the safety in having reflective helmets for night driving.

Most motorcycle helmets presently do not provide adequate reflecting material or surfaces. Some helmets provide reflection by attaching separate reflectors onto the helmet at various positions. Such an arrangement is quite costly and does not provide uniform reflection over the entire surface of the helmet. Some motorcycle helmets utilize a pattern of reflective tape arranged on the outer surface of the motorcycle helmet which although providing night reflection is not durable and long lasting.

The major disadvantages, therefore, of the prior art are the non-uniform distribution of the reflective material over the entire surface of the motorcycle helmet, not providing a reflective surface that is permanent and durable, not providing a reflective surface that is easily manufactured at a low cost, and providing a reflecting surface that detracts from the normal aesthetics of the motorcycle helmet.

OBJECTS OF THE INVENTION

It is an object of this invention to provide an improved reflective surface for a protective helmet.

It is a further object of this invention to provide a new method of manufacturing a protective helmet having a reflective material therein.

It is still another object of this invention to provide an integral internal reflective layer within a protective helmet.

It is still another object of this invention to provide an integral internal reflective layer below a clear protective layer wherein the reflective layer is composed of a plurality of reflective chips.

It is a further object of this invention to provide a method of manufacturing protective helmets wherein outer layers of a clear material are injected into a mold before reflective chips and fiberglass matting are positioned in the mold to finish the helmet.

It is still another object of this invention to provide a first layer of clear gel coat, a second layer of clear gel coat containing reflective chips, a third clear layer of gel coat containing metal flakes, a sealing layer of fiberglass mat, and a plurality of layers of fiberglass cloth deposited in a mold to form a protective helmet having an integral internal reflective material visible from the exterior.

SUMMARY OF THE INVENTION

The present invention comprises a protective helmet having a layer of reflective material integral with and internal to the motorcycle helmet. A first outer layer of clear catalyzed gel is provided for covering a second layer of gel in which small chips having opposite reflecting surfaces are randomly oriented, but of uniform density. A third layer of gel is provided, with or without metal flakes, for backing the second layer and for adhering to an inner fiberglass shell of the helmet. The outer layer of light transmitting gel can be sanded and painted in the normal fashion.

The method of making the protective helmet of the present invention involves the following steps. A light transmitting gel with a catalyst is sprayed under pressure onto the inner surface of a helmet mold and thoroughly dried. A thin layer of catalyzed gel is then sprayed over the first layer and allowed to dry until tacky during which time small reflective chips are sprinkled uniformly over the second coat and brushed flat. The second coat is completely dried. A third layer of gel, with or without metal flakes, is sprayed over the second layer containing the reflective chips. Since the three layers, due primarily to the addition of the light reflective chips, provide a rough surface, a fiberglass mat is brushed into place to eliminate any air spaces created by the reflective chips and to provide an inner smooth surface for the next several layers of fiberglass cloth. The helmet is completely dried and then popped out of the mold by air pressure. The outer surface of the helmet which comprises the first gel coat can be sanded, painted and finished in a conventional manner.

Other objects, advantages and capabilities of the present invention will become more apparent as the description proceeds taken in conjunction with the accompanying drawings.

DESCRIPTION OF THE PREFERRED EMBODIMENT

Figure 1:
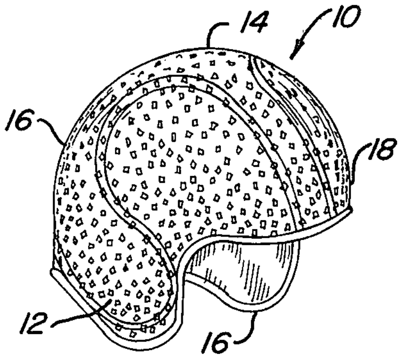
FIG. 1 is a perspective view of the protective helmet of the present invention showing the internal light reflective chips.

Referring to FIG. 1, the protective helmet 10 of the present invention is seen to be of generally hemispherical configuration with downwardly extending integral portions 12 for covering the ears of the user. The present invention is not limited to such a configuration but may embrace any protective helmet configuration having the desirability of an inner integral layer of reflective material.

More particularly, the helmet 10 shown in FIG. 1 has an upper hemispherical portion 14 extending linearly in the rear 16 to a point just above where the neck of the human body joins the area of the shoulder. From that point the protective helmet tapers downwardly to a centerline position 16 corresponding substantially to the centerline of the ears of the human body. The helmet now extends vertically upwardly to a point above the position of the eyes of the human body whereupon it extends horizontally until it merges into the forward section 18 of the hemispherical portion 14.

Figure 2:
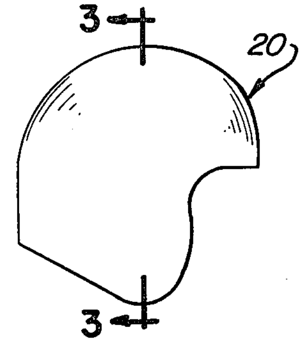
FIG. 2 is a side view of a mold in which the helmet of FIG. 1 may be formed.
Figure 3:
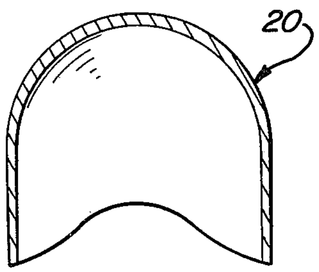
FIG. 3 is a center-line section of the mold of FIG. 2.
Figure 4:
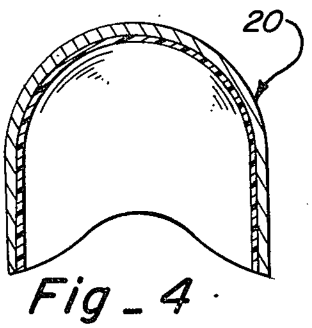
FIG. 4 is a section similar to FIG. 3 with a first layer of clear gel in the mold.
Figure 5:
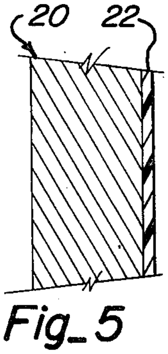
FIG. 5 is a fragmentary enlargement similar to FIG. 4 showing a section of the first layer of the mold.
Figure 6:
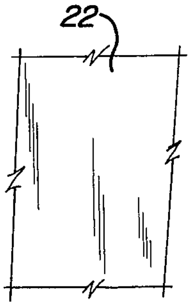
FIG. 6 illustrates the surface texture of the first layer of FIG. 5.

A mold 20, shown in FIG. 2, is utilized in the manufacturing of the helmet as will be herein more fully discussed. The mold 20 is formed from a rigid plastic material that is appropriately of larger dimensions than the resulting finished protective helmet 10 and conforms in shape and configuration to that of the resulting protective helmet 10.

The cross section of the helmet 10 of the present invention is shown in FIGS. 2 – 6 and comprises in aggregate several layers of material. The first layer or coat 22 is an approximately 10 mil layer of catalyzed clear gel coat. The next layer 24 is a clear gel coat of approximately 2 mils thickness into which is uniformly, but randomly disbursed, numerous thin chips 26 having reflective surfaces on opposite sides thereof. The clear gel coats 22 and 24 are preferably Polyester Gel Coat, Code Number 66–X36, manufactured by Ram Chemicals Company, Gardena, California, that is catalyzed with APOSET 600, manufactured by Aztec Chemicals Co., Elyrid, Ohio. Five cc's of the catalyst is added to each quart of the polyester gel coat. The reflective chips have been formed from reflective tape that is glued back-to-back in sheets and then cut into small ⅛ inch square chips by a formed die.

The next inner layer 28 completely covering the layer of reflective chips 26 is a layer comprising fifty percent conventional metal flakes 30 and fifty percent clear gel coat of the above mixture which forms the layer 28 preferably about five mils thick. This layer 28 provides an inner coating over the reflective chips 26. The addition of metal flakes 30 is not necessary to this invention but is provided for aesthetic reasons. In fact, the gel may be mixed with various color ingredients to provide a basic color to helmet 10.

It is desirable not to have the layers of the first, second and third gel coats 22, 24 and 28 over a total thickness of 20 mils with the particular gel coat substance used above. Thicker coats result in undesirable stress or star marks on the surface of the helmet 10 when external rivets, not shown, are inserted to provide, for example, connection points for a helmet shield or visor, not shown.

The next inner layer 32 is composed of ¾ oz. fiberglass that is matted over the entire surface of the layer of metal flake gel 28 in order to fill all air spaces 34 in the rough surface that is created by the reflective chips 26. The fiberglass mat 32 provides a smooth inner surface for bonding of fiberglass cloth layers 36. A heavy impact polyester resin is used to bond the fiberglass matting.

Figure 21:
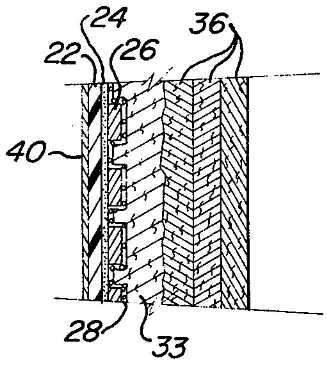
FIG. 21 is a fragmentary enlargement similar to FIG. 5 showing the addition of a paint layer to the first layer of clear gel coat.
Figure 22:
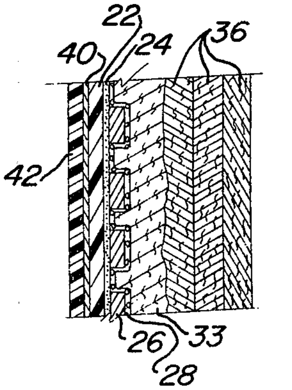
FIG. 22 is a fragmentary enlargement similar to FIG. 21 showing the addition of an outer protective layer to the helmet.

As is well known in the art, the number of fiberglass cloth layers 36 is representative of the overall strength and durability of the helmet 10 and a range in number of such layers 36 is possible. FIG. 21 shows a layer 40 of colored silicous lacquer preferably of the type manufactured by Deft Chemical Co. of Torrence, Cal., applied to the first layer 22 for providing coloring to the helmet. FIG. 22 shows the final layer 42 of clear enamel applied over the paint layer 40 for providing a tough scratch resistant outer surface. Typical of an enamel used is Model 03-X-21 Clear Enamel manufactured by Deft Chemical Co. of Torrence, California. The complete cross-section of the various layers of the protective helmet 10 of the present invention is shown in FIG. 22.

The following method is used to construct or manufacture the protective helmet 10. The mold 20 is first cleaned of all foreign substances and the first layer of clear gel coat 22 is blown into the mold under approximately 20 pounds pressure to an approximate thickness of 10 mils. The gel coat is allowed to dry completely which generally occurs in 4 hours at 70°.

Figure 7:
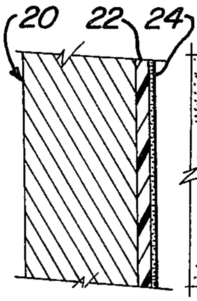
FIG. 7 is a fragmentary enlargement similar to FIG. 5 showing the addition of a second layer of clear gel coat.
Figure 8:
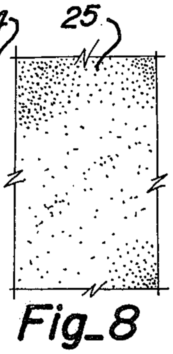
FIG. 8 illustrates the surface texture of the second layer of FIG. 7.
Figure 9:
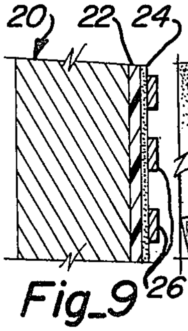
FIG. 9 is a fragmentary enlargement similar to FIG. 7 showing the addition of reflective chips to the second layer.
Figure 10:
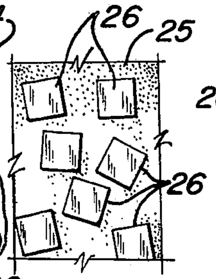
FIG. 10 illustrates the rough surface texture of the chips in the second layer of FIG. 9.
Figure 11:
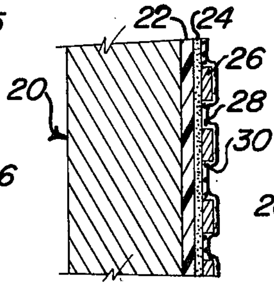
FIG. 11 is a fragmentary enlargement similar to FIG. 9 showing the addition of the back-up layer of gel containing metal flakes.
Figure 12:
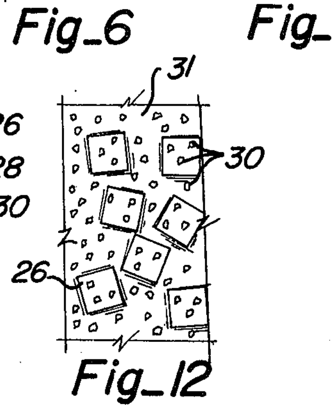
FIG. 12 illustrates the surface texture of the back-up layer of FIG. 11.
Figure 13:
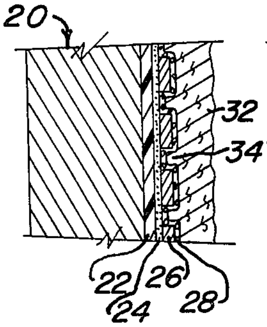
FIG. 13 is a fragmentary enlargement similar to FIG. 11 showing the addition of the fiberglass mat.
Figure 14:
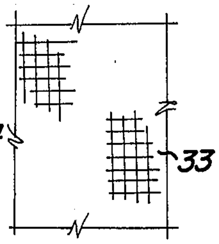
FIG. 14 illustrates the surface texture of the fiberglass mat of FIG. 13.
Figure 15:
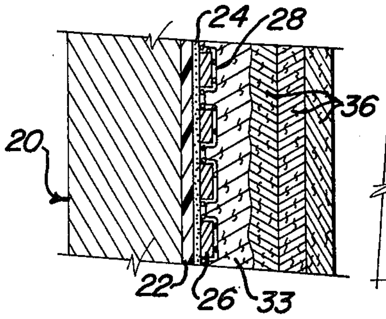
FIG. 15 is a fragmentary enlargement similar to FIG. 13 showing the addition of the layers of fiberglass cloth.
Figure 16:
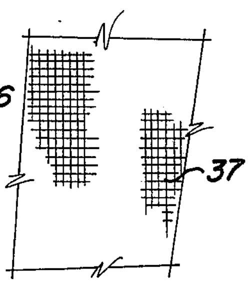
FIG. 16 illustrates the surface texture of the layers of fiberglass cloth of FIG. 15.
Figure 17:
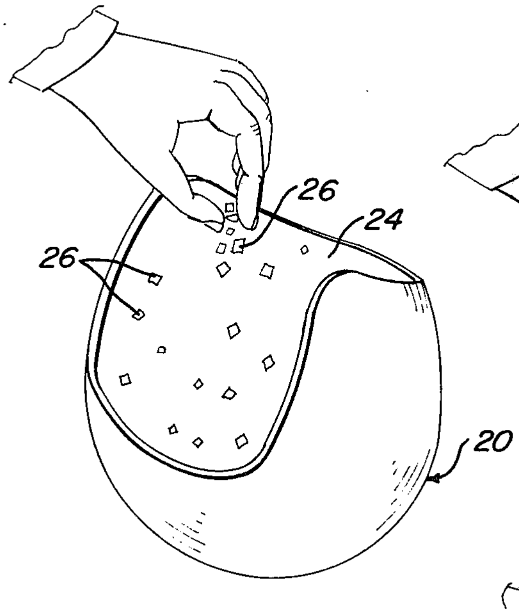
FIG. 17 pictorially illustrates the step of sprinkling reflective chips onto the second layer of gel coat within the mold.
Figure 18:
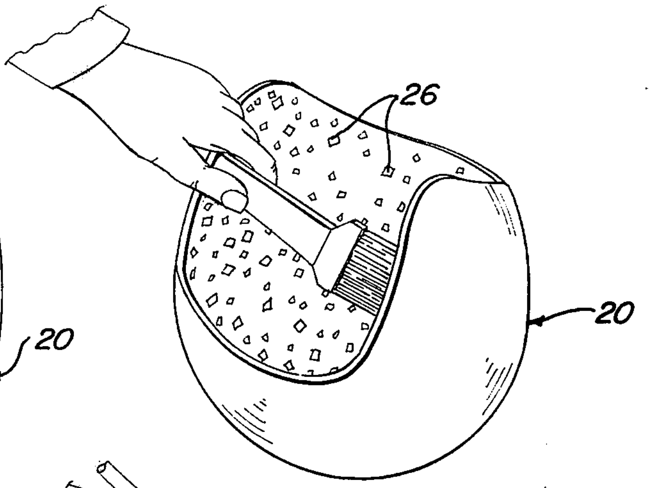
FIG. 18 pictorially illustrates the step of brushing the reflective chips into the second layer of gel coat.
Figure 19:
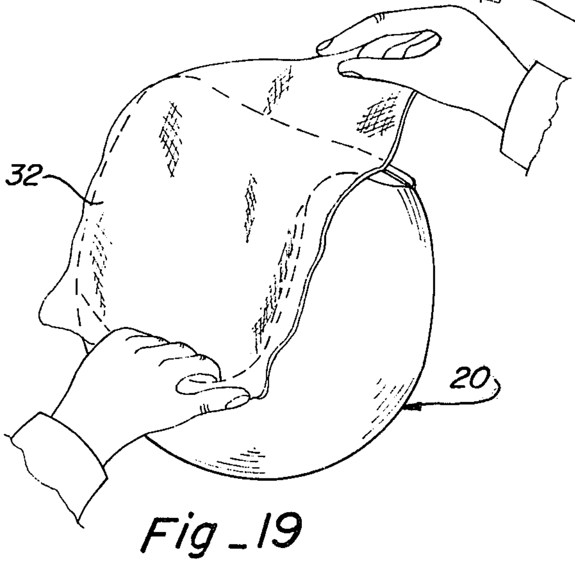
FIG. 19 pictorially illustrates the step of laying the fiberglass mat over the reflective chips.
Figure 20:
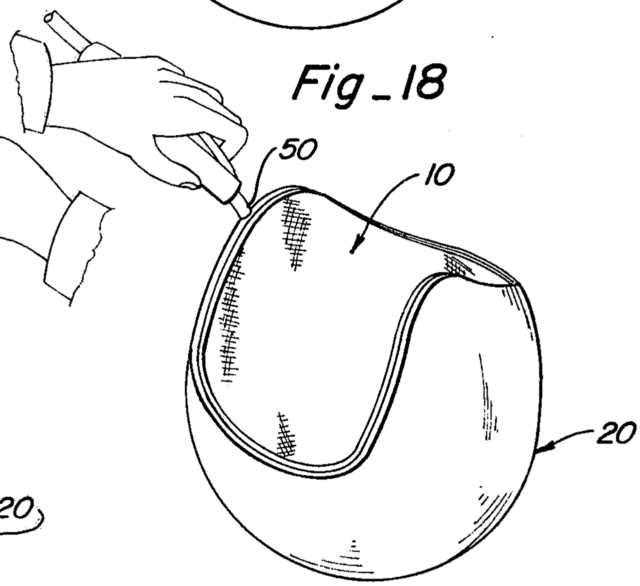
FIG. 20 pictorially illustrates the use of air pressure to pop the completed helmet out of the mold.

The second gel coat layer 24 is applied under approximately 20 pounds pressure to the inner surface of the first gel coat layer 22 to obtain an approximate thickness of 2 mils. The second gel coat layer is allowed to dry until tacky as shown in FIGS. 7 and 8. The reflective chips 26 are then sprinkled uniformly but in random angular orientation over most of the tacky surface 25 of the second gel coat layer 22 as shown in FIG. 17. Since some of the reflective chips 26 may enter the gel coat 24 perpendicular to the surface 25 thereof or at other various undesirable orientations, the reflective chips 26 are brushed flat, as shown in FIG. 18, so that the reflective surfaces of the chips 26 are substantially parallel with the surface 25 of the gel coat. The second gel coat layer 24 is allowed to dry completely which again is approximately 4 hours at 70°.

After the second gel coat 24 containing the flattened reflective chips 26 is completely dried, a 5 mil layer 28 of 50 percent metal flake to 50 percent clear gel is sprayed onto the surface 25. This layer is allowed to dry completely which is usually 4 hours at 70°.

A layer 32 of three-quarter ounce fiberglass mat is spread over the entire rough surface 31 of the reflective chips 26 in order to provide a smooth bonding surface 33 for later applied layers of fiberglass cloth 36. The fiberglass mat 32 is thoroughly saturated with a high impact resin and is carefully brushed and pressed into the mold 20 over surface 33 in order to fully eliminate all air pockets 34. Each layer of fiberglass cloth 36 is then successively applied. After applying all fiberglass cloth layers 36, the helmet 10 is allowed to thoroughly dry.

The helmet 10 is then ready to be popped out of the mold 20 by the injection of high pressure air 50 to the juncture of the helmet with the mold as shown in FIG. 18. The outer clear gel surface may require sanding to provide a smooth uniform surface to which the final decorative paint layer 40 and enamel 42 may be applied in a conventional fashion.

Accordingly, a protective helmet 10 having an internal integral reflective layer 24 and the method for making the same has been disclosed. It will be appreciated that the method and apparatus disclosed materially solves many problems currently facing the helmet industry in conforming to legislative requirements or consumer needs.

Although the present invention has been described with a certain degree of particularity, it is understood that the present disclosure has been made by way of example and that changes and details of structure and procedure may be made without imparting from the spirit thereof.

I claim:

1. In a structure having a shell of protective material, the improvement comprising:

a first layer of light transmitting gel coat containing metal flake and color ingredients uniformly formed over and integral with the outer surface of said shell, a plurality of randomly oriented flat reflective chips imbedded in at least portions of said shell and said first layer, each of said chips having a flat outer surface coplanar with the surface of said first layer, a second layer of light transmitting gel coat covering said flat outer surfaces of said chips and integral with the non-imbedded portions of said first layer, and a third layer of light transmitting gel coat uniformly formed over and integral with said second layer.

2. In the structure of claim 1 said light transmitting gel of said first, second and third layers in aggregate are less than 20 mils in thickness.

3. In the structure of claim 1 said light transmitting gel of said first, second and third layers containing a catalyst agent, and a fiberglass mat means disposed between said first layer and said protective shell for providing a smooth adhesion surface for said outer surface of said shell and for eliminating all air spaces between said chips.

4. A reflective helmet comprising:

a first layer of light transmitting gel forming the outer surface of said helmet, a plurality of flat light reflective chips having reflective surfaces on opposite flat sides, a second layer of light transmitting gel disposed uniformly on the inner surface of said first layer for affixing said chips to said first layer, said chips being oriented so that said flat sides are parallel with the surface of said first layer, a third layer of light transmitting gel disposed uniformly on the inner surface of said second layer for covering said second layer containing said chips, fiberglass mat means affixed to the inner surface of said third layer for eliminating air spaces between said chips and for providing a smooth binding surface, and a plurality of layers of fiberglass cloth uniformly applied to said smooth binding surface of said fiberglass mat means for forming the shell of said helmet.

5. The reflective helmet of claim 4 wherein the aggregate thickness of said first three layers is less than 20 mils.

6. The reflective helmet of claim 4 wherein said first layer is substantially 10 mils thick.

7. The reflective helmet of claim 4 wherein said second layer is substantially 2 mils thick.

8. The reflective helmet of claim 4 wherein said third layer is substantially 5 mils thick.

* * * * *